United States Patent [19]

Voituriez et al.

[11] 4,191,410
[45] Mar. 4, 1980

[54] DEVICE FOR ASSEMBLING IN PARTICULAR TWO SECTIONS OF A BLAST DOWNPIPE OF A BLAST FURNACE

[75] Inventors: Henry Voituriez, Dunkerque; René Aymard, Grande Synthe, both of France

[73] Assignee: Union Siderurgique du Nord et de l'est de la France, Paris, France

[21] Appl. No.: 946,735

[22] Filed: Sep. 29, 1978

[30] Foreign Application Priority Data

Sep. 30, 1977 [FR] France ................... 77 29505

[51] Int. Cl.² ......................................... F16L 17/06
[52] U.S. Cl. ........................... 285/367; 285/411
[58] Field of Search ............ 285/367, 366, 365, 411, 285/410, 409, 408, 407

[56] References Cited

U.S. PATENT DOCUMENTS

| 2,640,717 | 6/1953 | Scheuring | 285/411 |
| 2,895,748 | 7/1959 | Oldham | 285/367 X |
| 3,070,388 | 12/1962 | Werth | 285/411 |
| 3,661,409 | 5/1972 | Brown et al. | 285/367 X |
| 3,843,167 | 10/1974 | Morrill et al. | 285/411 X |
| 4,079,970 | 3/1978 | Brett | 285/367 X |

FOREIGN PATENT DOCUMENTS

| 2404890 | 10/1974 | Fed. Rep. of Germany | 285/367 |
| 854629 | 11/1960 | United Kingdom | 285/367 |

Primary Examiner—Thomas F. Callaghan
Attorney, Agent, or Firm—Burns, Doane, Swecker & Mathis

[57] ABSTRACT

The device is adapted to facilitate the assembly and disassembly of pipe sections in a blast downpipe. It comprises two flanges defining frustoconical bearing surfaces and a collar comprising clamping jaws which engage on said bearing surfaces. The collar is suspended from a support constructed in two parts, one of which parts is fixed and the other pivotally mounted on the first part. The collar may be clamped or unclamped by means of two screw and nut units.

10 Claims, 4 Drawing Figures

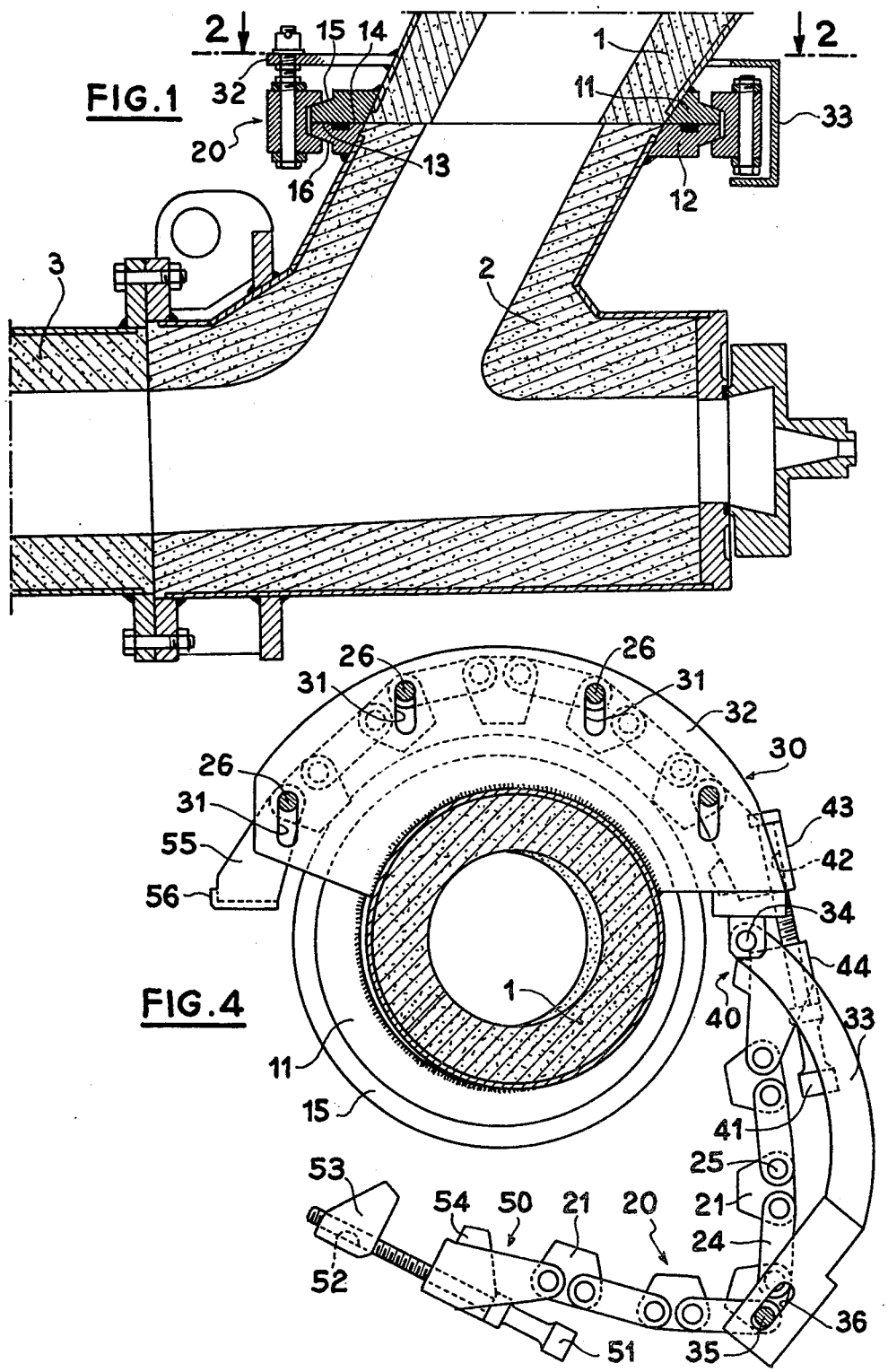

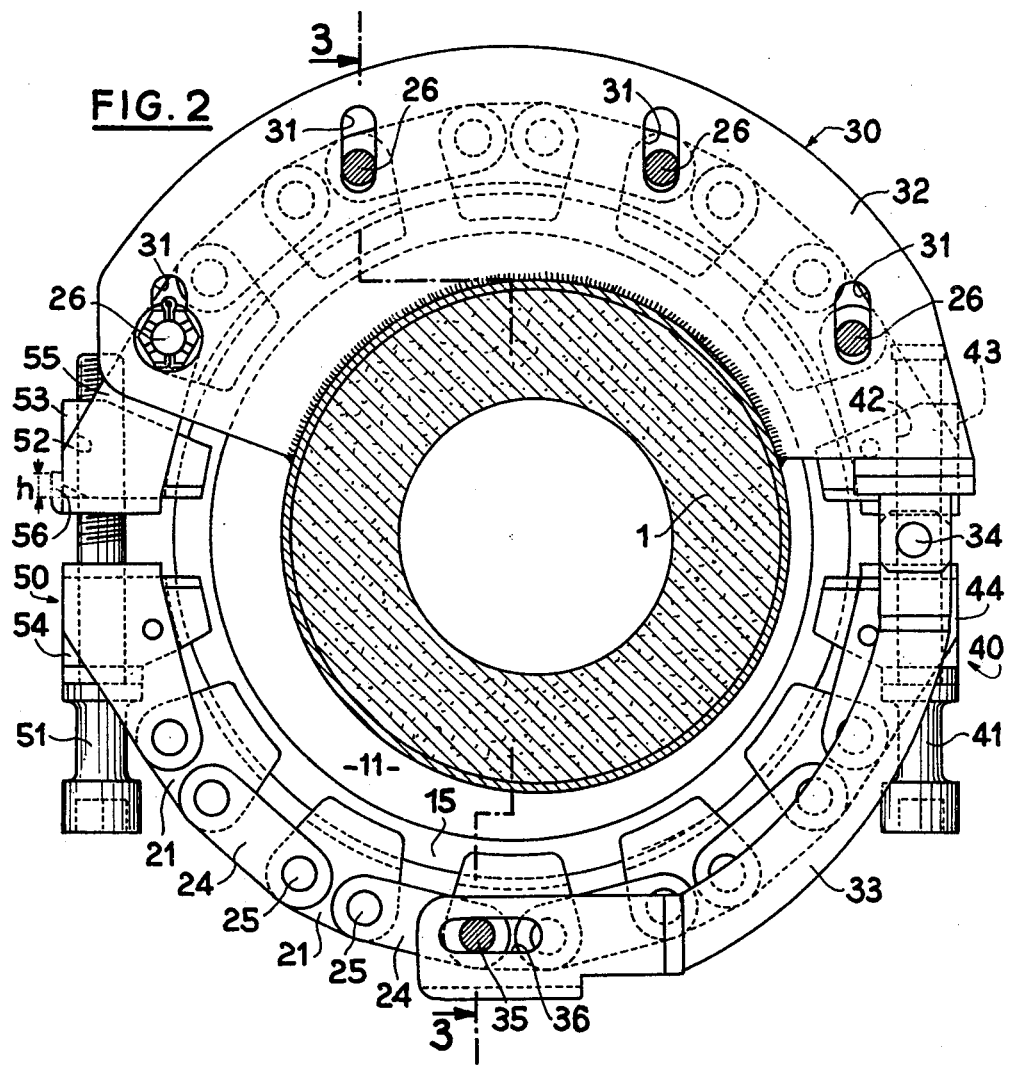
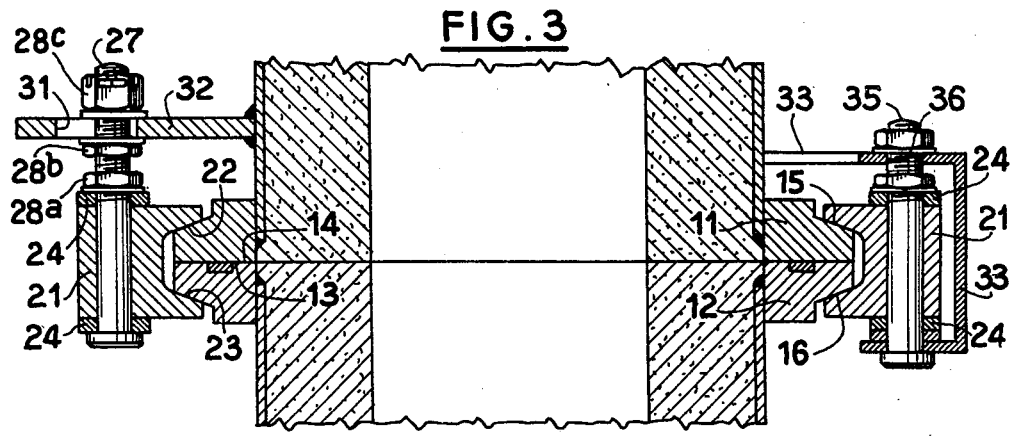

DEVICE FOR ASSEMBLING IN PARTICULAR TWO SECTIONS OF A BLAST DOWNPIPE OF A BLAST FURNACE

The present invention relates to apparatus for supplying hot air or hot blast to blast furnaces.

Such apparatus comprise a circular hot blast pipe connected by blast downpipes to tuyeres, the expression downpipe here designating the assembly of the pipe elements placed between the circular pipe and the tuyere. In the known apparatus, the successive elements are connected by flanges which are assembled by means of studblots and nuts or keys. Owing to this type of assembly, it is long and difficult to replace one of the elements since the disengagement of the keys or the unscrewing of the nuts is rendered difficult and uncomfortable owing to the high temperature of the parts and the surrounding atmosphere.

There are moreover known in other sectors of the art devices for assembling two pipe elements comprising two flanges respectively carried by each of the two elements to be assembled, these flanges comprising facing sealing surfaces and frustoconical surfaces adapted to cooperate with complementary surfaces formed on jaws, the latter being interconnected by links so as to constitute a collar provided with clamping and unclamping means. However, such devices do not allow in this form a rapid assembly and disassembly in the considered application in which the elements to be assembly are particularly heavy and cumbersome.

An object of the invention is to provide a device for assembling two elements of a hot blast downpipe which does not have the drawbacks of the known devices and is precise and easy and rapid to assemble and disassemble.

According to the invention the collar is suspended from a support constructed in two parts, a first part fixed to said upper element and a second part pivotally mounted on the first part to pivot about an axis parallel to the axes of articulation between the links of the collar so as to allow the opening and release of the collar and thereby permit the assembly and disassembly of the lower element of the blast downpipe.

According to other features of the invention:

the fixed part of the support comprises a partly annular plate which subtends an angle at the centre of less than 180°;

the moving part of the support comprises an arm of curved shape which subtends an angle at the centre of about 90° and supports the collar in the vicinity of the free end thereof;

the clamping and unclamping means comprise two screw and nut units which are roughly diametrally opposed, one of which is associated with means for rapidly unlocking and permitting after a given unscrewing of the screw, the release of the screw and nut means of the adjacent element of the collar so as to be able to open the latter.

The invention is described in more detail hereinafter with reference to the accompanying drawing which is given solely by way of example and in which:

FIG. 1 is a vertical sectional view of a part of a blast downpipe to which the invention is applied;

FIG. 2 is a horizontal sectional view taken on line 2—2 of FIG. 1;

FIG. 3 is a sectional view taken on line 3—3 of FIG. 2, and

FIG. 4 is a view similar to FIG. 2 to a smaller scale showing the device in its open position.

FIG. 1 shows a part of a blast furnace blast downpipe comprising an upper element 1 which is in fact the lower cone and a lower element 2 in the shape of a T or lower mouth, on which there is fixed a cone pipe 3. The device according to the invention is employed for achieving the assembly between the conical element 1 and the element 2.

This device mainly comprises two flanges 11, 12 which are respectively fixed to the ends of the elements 1 and 2 and have facing sealing surfaces 13, 14 which are planar and horizontal, and opposite or outer frustoconical surfaces 15, 16. These two flanges make therefore an angle with a plane perpendicular to the axis of the elements 1 and 2. They cooperate with a clamping collar 20 which is seen better in FIGS. 2 and 3 and which comprises a plurality of jaws 21, the inner surface of which defines two frustoconical surfaces 22, 23 having a wedging effect so as to be capable of cooperating with the surfaces 15, 16 and achieve the clamping of the flanges. These jaws are interconnected by links 24 and are pivotally connected to the latter by pins 25. The surfaces of the flanges and jaws are preferably subjected to a sulphurisation or like treatment adapted to impart thereto the required surface condition.

The collar 20 is suspended from a first support 30 by rods 26 which constitute the extensions of some of the pivot pins 25 comprising upper screwthreaded portions 27 received in apertures 31 of oblong shape formed in the support and associated with nuts 28a, 28b, 28c. The support 30 comprises a partly annular plate 32 which is welded to the upper element 1 and subtends an angle at the centre of less then 180°. The apertures 31 receive the rods 26 and have an oblong shape and are roughly parallel to the direction of disengagement of the lower element 2. Mounted on this fixed part of the support is a second support in form of an arm 33 which is mounted to pivot about a vertical axis 34, this arm subtending an angle at the centre of about 90° and supporting the collar 20 in the vicinity of the free end thereof by means of a rod 35 received in an aperture 36 which is also of oblong shape but extends roughly in the direction perpendicular to the aperture 31 when the collar is in the closed position as shown in FIG. 2. This arm has a general C-section as can be seen in FIG. 3.

The means for clamping and unclamping the collar comprise two screw and nut units 40, 50 which are diametrally opposed and whose screws 41, 51 are oriented, in the clamping position, in a direction roughly parallel to the apertures 31. The first unit 40 is placed in the vicinity of the pivotal connection 34 between the two parts of the support and comprises a screw 41 and a nut 42 defined by a jaw 43. The screw 41 is rotatably mounted in a jaw element 44. The jaws 43, 44 are of course unconnected by any link but connected by the screw 41 and the nut 42.

The other screw and nut unit 50 also comprises a screw 51 and a nut 52 defined by a jaw 53. The screw 51 is rotatably mounted on a jaw element 54 and no link is provided between the jaws 53, 54. The collar 20 is therefore in fact constructed in the form of two half-collars which are interconnected by the two clamping units 40, 50. Moreover, in this subassembly 50, the jaw element 53 may be disengaged from the link 55 in which it is received, this link constituting a fork member and comprising a flange 56 against which the lateral surface of the jaw 53 normally bears. The jaw elemet 53 forming a nut may be disengaged laterally from the link 55 as soon as the screw 51 has been unscrewed a distance at least equal to the height h of the flange 56.

The device just described operates in a very simple manner and will be understood directly from the foregoing description. In the position shown in FIGS. 2 and 3, the two elements 1, 2 of the blast downpipe are assembled and the collar 20 is clamped by the two screw and nut units 40 and 50. The jaws 21, 43, 44, 53, 54 arranged around the whole of the periphery of the flanges 11, 12 achieve by a wedging effect the sealed clamping of these two flanges against each other.

In order to release and disassemble the lower element, the two screw and nut units are unscrewed, the screw 51 being unscrewed sufficiently to allow the release of the nuts 52, 53 from the cavity therefor. When this has been done (FIG. 4), the arm 33 can be disengaged by rotation about a pin 34 and the collar 20 opened as shown in FIG. 4. The flanges are no longer clamped against each other and the lower element can be separated from the upper element. Although it is horizontal, the collar may be opened on more than 180° thereof, owing to the construction of the support in two parts whih are pivoted together.

Reassembly is achieved just as simply and rapidly since it is sufficient to bring the two flanges in contact with each other, place the collar 20 and the nut 52, 53 in position, and then tighten the two screws 41, 51 so as to achieve an automatic centering and a strong connection between the two elements.

The desired result is consequently achieved by relatively simple and strong means.

It must be understood that the device may be subjected to various modifications, a single screw and nut unit having a rapid release similar to the unit 50 may, if desired, be provided. The support means and suspension means of the collar may also undergo various modifications.

Having now described our invention what we claim as new and desire to secure by Letters Patent is:

1. In a device for assembling two pipe elements and in particular an upper element and a lower element of a blast downpipe supplying blast to a blast furnace, the device comprising two flanges respectively carried by said two elements, said flanges defining facing sealing surfaces and frustoconical surfaces, jaws arranged around the entire circumference of the flanges in spaced apart relation to each other and defining frustoconical surfaces which are complementary to and cooperative with the frustoconical surfaces of the flanges, links, means pivotally connecting the links to the jaws so that the links and jaws pivot about substantially vertical axes and constitute an articulated collar, clamping and unclamping means combined with the collar for selectively clamping and unclamping the collar, and support means supporting the collar relative to the upper pipe element; the improvement wherein said support means comprise a first support part fixed to the upper pipe element and a second support part having a first end portion and a second end portion which is opposed to the first end portion and is mounted on the first support part to pivot about an axis substantially parallel to said pivot axes, and means supportingly mounting the collar at a plurality of points on the combined first support part and second support part so that the collar is held substantially in a plane perpendicular to said axes while it is movable substantially in said plane for clamping purposes, said mounting points being located in a region of the collar corresponding to substantially three-quarters of the circumferential extent of the collar, and one of said mounting points being located in said first end portion of the second support part, and the second part representing substantially one quarter of the circumferential extent of the collar.

2. A device as claimed in claim 1, wherein the first support part comprises a partly annular plate which subtends an angle at the centre of the flanges of less than 180°.

3. A device as claimed in claim 1 or 2, wherein the clamping and unclamping means comprise two screw and nut units which are substantially diametrally opposed, one of said units being placed in the vicinity of said pivot axis of the two support parts.

4. A device as claimed in claim 3, comprising rods suspending the collar from the first support part ad second support part, which rods also define pivot pins defining the pivot axes of the links and jaws of the collar, elongated apertures which are formed in the first support part and supportingly receive the rods and are substantially parallel to each other and an elongated aperture which is formed in the second support part and is oriented in a direction substantially perpendicular to the apertures in the first support part when the device is in the closed clamping position, the screws of the two units being oriented, in the clamping position of the collar, substantially in a direction parallel to said apertures formed in the first support part.

5. A device as claimed in claim 3, wherein the screw of each unit is rotatably mounted in one of the jaw elements, the nut associated with each screw also being formed in one of the jaw elements.

6. A device as claimed in claim 5, wherein in one of said units one of said links is in the shape of a fork member defining a lateral flange and the jaw element defining the corresponding nut is received in a detachable manner in said link in the shape of a fork member and is retained by the lateral flange.

7. A device as claimed in claim 1, wherein said sealing surfaces are substantially contained in a horizontal joint plane whereas the upper and lower elements have axes which are inclined relative to the joint plane.

8. A device as claimed in claim 1, wherein said means supportingly mounting the collar on the first support part and second support part comprise means slidingly supporting the jaws on the first and second support parts with play in said plane, said play with respect to the first support part allowing displacement of the jaws away from a diameter of the flanges to allow disengagement of the jaws from the flanges and said play with respect to the second support part being in a direction substantially parallel to said diameter in the closed clamping position of the device 9. In a device for assembling two pipe elements and in particular an upper element and a lower element of a blast downpipe supplying blast to a blast furnace, the device comprising two flanges respectively carried by said two elements, said flanges defining facing sealing surfaces and frustoconical surfaces, jaws arranged around the entire circumference of the flanges in spaced apart relation to each other and defining frustoconical surfaces which are complementary to and cooperative with the frustoconical surfaces of the flanges, links, means pivotally connecting the links to the jaws so that the links and jaws pivot about substantially vertical axes and constitute an articulated collar, clamping and unclamping means combined with the collar for selectively clamping and unclamping the collar, and support means supporting the collar relative to the upper pipe element; the improvement wherein said support means comprise a first support part fixed to the upper pipe element and a second support part having a first end portion and a second end portion which is opposed to the first end portion and is mounted on the first support part to pivot about an axis substantially parallel to said pivot axes, and means supportingly mounting the collar at a plurality of points on the combined first support part and second support part so that the collar is held substantially in a plane perpendicular to said axes while it is movable substantially in said plane for clamping purposes, said mounting points being located in a region of the collar corresponding to substantially three-quarters of the circumferential extent of the collar, and one of said mounting points being located in said first end portion of the second support part, and the second part representing substantially one quarter of the circumferential extent of the collar, said means supportingly mounting the collar comprising rods suspending the collar from the first support part and second support part, which rods also define pivot pins defining the pivot axes of the links and jaws of the collar, elongated apertures which are formed in the first support part and supportingly receive the rods and are substantially parallel to each other and an elongated aperture which is formed in the second support part and is oriented in a direction substantially perpendicular to the apertures in the first support part when the device is in the closed clamping position.

10. A device as claimed in claim 1, 9, or 2, wherein the second support part comprises an arm of curved shape which subtends an angle at the centre of the flanges of substantially 90° between the pivotal mounting on the first support part and the point at which the collar is supported by the second support part.

* * * * *